US010563817B2

(12) United States Patent
Rutz

(10) Patent No.: US 10,563,817 B2
(45) Date of Patent: Feb. 18, 2020

(54) CAMERA HINGE ARRANGEMENT

(71) Applicant: Alfred Rutz, Berlin (DE)

(72) Inventor: Alfred Rutz, Berlin (DE)

(*) Notice: Subject to any disclaimer, the term of this patent is extended or adjusted under 35 U.S.C. 154(b) by 147 days.

(21) Appl. No.: 15/578,433

(22) PCT Filed: Jun. 14, 2016

(86) PCT No.: PCT/EP2016/000987
§ 371 (c)(1),
(2) Date: Nov. 30, 2017

(87) PCT Pub. No.: WO2016/202451
PCT Pub. Date: Dec. 22, 2016

(65) Prior Publication Data
US 2018/0149308 A1    May 31, 2018

(30) Foreign Application Priority Data
Jun. 16, 2015 (DE) .................. 10 2015 007 549

(51) Int. Cl.
*F16M 13/04* (2006.01)
*F16M 11/08* (2006.01)
(Continued)

(52) U.S. Cl.
CPC ............. *F16M 13/04* (2013.01); *F16C 11/10* (2013.01); *F16H 19/0645* (2013.01);
(Continued)

(58) Field of Classification Search
CPC ........ F16M 13/00; F16M 13/04; F16M 11/08; F16M 11/18; F16M 11/2021;
(Continued)

(56) References Cited

U.S. PATENT DOCUMENTS 4,392,140 A * 7/1983 Bastian .................. F16M 11/18
343/765
5,454,042 A    9/1995 Drever
(Continued)

FOREIGN PATENT DOCUMENTS

WO    2014198415    12/2014

*Primary Examiner* — Thomas C Diaz
(74) *Attorney, Agent, or Firm* — Volpe and Koenig, P.C.

(57) ABSTRACT

A camera hinge arrangement (1) has a head hinge (2) and a base hinge (4). The head hinge (2) includes a movable head hinge element (3) while the base hinge (4) includes a movable base hinge element (5). The head hinge (2) and the base hinge (4) are connected to each other via the movable base hinge element (5). The camera hinge arrangement (1) in each case has a control cable (9, 10) and at least one restoring element (11, 12) for both the movable head hinge element (3) and the movable base hinge element (5). The movable head hinge element (3) and the movable base hinge element (5) are both connected here to one of the two control cables (9, 10) and to at least one of the restoring elements (11, 12) in such a manner that the movable head hinge element (3) and the movable base hinge element (5) are movable out of a starting position counter to a restoring force of the restoring elements (11, 12) by a pull action on the control cables (9, 10).

21 Claims, 2 Drawing Sheets

(51) Int. Cl.
*F16M 11/20* (2006.01)
*F16M 11/18* (2006.01)
*F16C 11/10* (2006.01)
*F16H 19/06* (2006.01)
*G03B 17/56* (2006.01)

(52) U.S. Cl.
CPC ............. *F16M 11/08* (2013.01); *F16M 11/18* (2013.01); *F16M 11/2021* (2013.01); *G03B 17/561* (2013.01); *F16H 2019/0695* (2013.01); *F16M 2200/024* (2013.01)

(58) Field of Classification Search
CPC .... F16M 2200/024; F16C 11/06; F16C 11/10; F16H 19/0645; F16H 2019/0695; G03B 17/561; G03B 17/56
See application file for complete search history.

(56) References Cited

U.S. PATENT DOCUMENTS

| | | |
|---|---|---|
| 6,045,272 A | 4/2000 | Ryan et al. |
| 2010/0264283 A1* | 10/2010 | Stoffel ................... F16M 13/04 248/178.1 |

\* cited by examiner

CAMERA HINGE ARRANGEMENT

BACKGROUND

The invention relates to a camera hinge arrangement having a head hinge with a movable head hinge element and having a base hinge with a movable base hinge element, wherein the head hinge and the base hinge are connected together by the movable base hinge element and a fastening device for the releasable fastening of a video recording device, in particular a handy camera, an action system compact camera or the like, is arranged on the movable head hinge element, wherein a head hinge axis is aligned transversely to a base hinge axis.

The most varied realizations of such camera hinge arrangements are disclosed in the prior art. Camera hinge arrangements which can be operated by motor are thus known. These motor-operated camera hinge arrangements, however, are unsuitable, as a rule, in particular in harsh environmental conditions, for example on the beach and/or also in water, as their function can be impaired under such adverse conditions. In addition, as a rule, such systems are fed from a power pack or a battery and no longer function when these are flat.

Consequently, mechanically-manually operable camera hinge arrangements are preferred precisely for such environmental conditions. In the case of mechanically-manually operable camera hinge arrangements, the difficulty it is often, on the one hand, to make them operable or portable using only a hand or only an arm and, on the other hand, to make the movement and control of the camera hinge arrangement as smooth-running as possible. In addition, it is desirable in the case of such camera hinge arrangements to control the movements of the camera hinge arrangement in as reliable and precise a manner as possible.

SUMMARY

It is the object of the invention, consequently, to create a camera hinge arrangement of the type defined in the introduction which can be used, for one thing, in a reliable manner even in adverse environmental conditions and the handling of which is simplified.

This object is achieved with the camera hinge arrangement of the type noted in the introduction with one or more features of the invention. It is provided, in particular, to achieve the object that the camera hinge arrangement comprises in each case one control cable and in each case at least one restoring element for the movable head hinge element and the movable base hinge element, wherein the movable head hinge element and the movable base hinge element are connected in such a manner in each case to a control cable and in each case to at least one restoring element that the movable head hinge element and the movable base hinge element are movable out of a starting position in opposition to a restoring force of the restoring elements as a result of pull on the control cables. Created in this way is a camera hinge arrangement, the movable head hinge element of which and the movable base hinge element of which are able to be adjusted by way of only one control cable in each case in a reliable and precise manner in opposition to the restoring forces of the restoring elements assigned to the head hinge element and to the base hinge element. As the restoring movement is carried out by the restoring elements, it is possible to dispense with two additional control cables. Consequently, said cameral hinge arrangement manages with only two control cables which can be gripped and pulled either directly by a user of the camera hinge arrangement, but which can also be connected to a correspondingly realized control element which a user can use to operate the camera hinge arrangement.

It is obviously also conceivable to operate the two control cables of the camera hinge arrangement in a motor-driven manner, the simpler, mechanical-manual operation being preferred for the majority of applications. Consequently, it can be particularly advantageous when the head hinge and the base hinge are pivotable in a mechanical-manual manner by the two control cables. In particular in conjunction with a portable video recorder, such as a smart phone, an action cam or the like, a mechanically-manually controllable camera arrangement according to the invention is often advantageous as it can be very light in weight such that one-handed control and one-armed or one-handed handling and carrying of the camera hinge arrangement is also possible.

It can be expedient when the camera hinge arrangement includes a base, on which a first guide roller and a pair of second guide rollers are arranged for guiding the control cable of the movable head hinge element. These guide rollers enable a significant reduction in the friction forces acting on the control cable assigned to the movable head hinge element, above all when the base hinge is held pivoted and consequently the control cable assigned to the movable head hinge element has to be guided along an angled track to the movable head hinge element. Without the aforementioned guide rollers, there can be a correspondingly higher degree of friction on the control cable, namely precisely when the control cable of the movable head hinge element has a curved progression on account of the moveable base hinge element assuming an angled position, and said higher degree of friction can make a smooth-running movement or adjustment of the movable head hinge element more difficult.

In this case, the first guide roller can be arranged in such a manner on the camera hinge arrangement that a rotational axis of the first guide roller is aligned parallel to the head hinge axis. Particularly favorable guiding of the control cable assigned to the movable head element can also be produced when the pair of second guide rollers is arranged such that its rotational axes are aligned transversely or at right angles to the rotational axis of the first guide roller.

Exchanging the control cable that is assigned to the movable head hinge element can be simplified when the first guide roller and/or the pair of second guide rollers are arranged at a spacing from a longitudinal center axis of the camera hinge arrangement and/or at a spacing from a longitudinal center base of the base. It can be particularly advantageous when the guide roller and/or the pair of second guide rollers are arranged on a free outer surface of the base. They are thus accessible to a user of the camera hinge arrangement namely in an even better manner and, for example, can be cleaned or even, where applicable, exchanged with only a small amount of "effort".

In order to be able to guide the control cable assigned to the movable head hinge element in a reliable manner, even when the camera hinge arrangement is aligned arbitrarily in space, it can be expedient when each guide roller comprises a radial guide groove for guiding the control cable of the movable head hinge element.

Particularly reliable guiding of the control cable assigned to the movable head hinge element can be produced when the pair of second guide rollers is arranged in such a manner on the base that radial guide grooves of the pair of second guide rollers form a guide duct, through which the control cable of the movable head hinge element runs in the operating position. In this case, preferably a longitudinal center axis of the guide duct can be parallel to or, however, congruent with a longitudinal center axis of the base, depending on how the camera hinge arrangement is specifically configured.

In addition to this or as an alternative to it, it can also be provided that the first guide roller is arranged in such a manner on the base that a tangent, placed onto a groove bottom of a, for example of the previously mentioned, guide groove of the first guide roller, runs through a, for example the already previously mentioned, guide duct between the pair of second guide rollers. In this way, the control cable of the movable head hinge element can be guided along a straight line from the first guide roller through the guide duct which can be realized between the pair of second guide rollers. This can also reduce the friction acting on the control cable of the movable head hinge element which needs to be reduced wherever possible.

In order to move the movable head hinge element automatically in the direction of its starting position as the pull is reduced on its control cable, it can be expedient when at least one restoring element is arranged between the movable head hinge element and a second head hinge element.

In an analogous manner, it can be expedient for the automatic restoring of the movable base hinge element when at least one restoring element is arranged between the movable base hinge element and a second base hinge element and/or the base.

In the case of a particularly compact and consequently particularly advantageous embodiment of the camera hinge arrangement according to the invention, it can be provided that a, for example the previously mentioned, second head hinge element is connected to the movable base hinge element. In a preferred manner, in this case, the second head hinge element and the movable base hinge element can be connected together in an integral manner. In this way, a movement of the movable base hinge element can be reliably transmitted via the second head hinge element to the head hinge of the camera hinge arrangement.

In order to enable mobility of the movable head hinge element relative to the second head hinge element, it is expedient when at least one head bearing is arranged between the movable head hinge element and a, for example the aforementioned, second head hinge element. This head bearing can be realized, in this case, for example, as a ball bearing or, however, also as a sliding bearing.

In addition to this or as an alternative to it, it can also be provided that at least one base bearing is arranged between the movable base hinge element and a, for example the already previously mentioned, second base hinge element and/or a, for example the already previously mentioned, base. Said base bearing, in this case, can include, in particular, at least one ball bearing and/or at least one sliding bearing and thus makes possible the mobility of the movable base hinge element relative to the second base hinge element and also to a or the base of the camera hinge arrangement.

In the case of an advantageous embodiment of the camera hinge arrangement, it can be provided that a, for example the already previously mentioned, second head hinge element comprises a cavity, in which a, for example the already previously mentioned, at least one head bearing and/or the at least one restoring element of the movable head hinge element and/or at least part of the movable head hinge element are arranged. In the case of such an arrangement, the at least one restoring element and the at least one head bearing can be arranged protected particularly well in the interior of the second head hinge element. An arrangement of the movable head hinge element in the interior of the second head hinge element also allows for a more compact configuration of the camera hinge arrangement which is significant in particular when the camera hinge arrangement is to be carried and operated by way of only one hand/by way of only one arm.

In addition to this or as alternative to it, it can also be provided that the movable base hinge element comprises a cavity in which an, for example the already previously mentioned, at least one base bearing and/or the at least one restoring element of the movable base hinge element and/or at least part of a, for example of the already previously mentioned, base and/or at least part of a, for example the already previously mentioned, second base hinge element are arranged. This arrangement of the previously specified elements in the interior of the cavity of the movable base hinge element can also contribute to an even more compact configuration of the camera hinge arrangement.

The control of the movable base hinge element by its control cable can be effected in an even easier manner when the movable base hinge element is realized in a plate-shaped or wheel-shaped manner and comprises a radial guide channel, which extends over at least part of its periphery and in which the control cable of the movable base hinge element is guided in the operating position. When the control cable of the movable base hinge element is arranged in the previously described guide channel in the operating position, the control cable of the movable base hinge element can also be reliably prevented from slipping.

However, it is also possible for the camera hinge arrangement to comprise a transmission disk, which is connected in a non-rotatable manner to the movable base hinge element and comprises a radial guide channel, which extends over at least part of its periphery and in which the control cable of the movable base hinge element is guided in the operating position. It is possible, in this way, to store, for example, transmission disks with different diameters and, where required, to connect them to the movable base hinge element in order to be able to provide different gear ratios and/or also different paths of movement for the control cable for control and adjustment of the movable base hinge element.

It can be particularly advantageous when a, for example the already previously mentioned, guide channel is aligned in the movable base hinge element and/or in a, for example the already previously mentioned, transmission disk of the movable base hinge element transversally or at right angles to the base hinge axis.

In the case of a further embodiment of the camera hinge arrangement, it can be provided that the base hinge is lockable, and/or an adjustment range of the base hinge is limitable. This can occur, in particular, by a locking element, which acts in the locking position between the movable base hinge element and a, for example the already previously mentioned, second base hinge element and/or a, for example the already previously mentioned, base of the camera hinge arrangement. This locking element can be, for example, a pin, a ballpoint pen, a screw, a split pin or also a bolt or a similar element.

In this case, it can be expedient when the movable base hinge element comprises at least one locking opening, into which a locking element, for example the previously mentioned locking element, is insertable for locking and/or for limiting the adjustment range of the base hinge. In the case of a further advantageous embodiment of the camera hinge arrangement according to the invention, it can be provided that a, for example the previously mentioned, base is realized in a bifurcated manner or as a fork. A fork in the context of this invention is also to be understood as a fork with only one leg or with only one prong.

In addition to this or as an alternative to it, it can be provided that the base is realized as a fork which is slotted at least on one side. As a result of the slotted configuration of the bifurcated base, on the one hand the weight of the base can be reduced and, on the other hand, a, for example the previously mentioned, locking element can be guided through the slotted fork for locking the movable base hinge element and, as a result, the movable base hinge element can be fixed at least temporarily relative to the base.

It can be advantageous when a, for example the already previously mentioned, base is connectable to a carrier element. In this case, it can be provided that said connection is producible or is produced in a releasable manner, for example by a threaded connection, or, however, also that said connection between the camera hinge arrangement and in particular between the previously mentioned base and a carrier element is producible or is produced as a result of bonding and is then not non-destructively releasable.

Such a carrier element can be, for example, a tripod, a camera arm, a camera crane, a holding rod or also a holding tube.

For connecting the camera hinge arrangement or the base to the previously specified carrier elements, it can be particularly advantageous when a, the already previously mentioned, base comprises a receiving opening into which a connection element of such a carrier element is insertable for the fastening of the camera hinge arrangement on said carrier element. For the sake of completeness, it must be pointed out once again that these carrier elements can be, for example, a tripod, a camera arm, a camera crane, a holding rod and/or a holding tube or the like. Here too, the connection between the carrier element and the camera hinge arrangement of a or the base of the camera hinge arrangement can be releasable or not non-destructively releasable, for example bonded.

When a, for example the already previously mentioned, base comprises feed-through openings for the two control cables, it is possible to guide the two control cables from inside, for example from the interior of a carrier element, through the base to the movable head hinge element and the movable base hinge element. It can be particularly advantageous when the feed-through openings open out into a, for example the already previously mentioned, receiving opening of the base.

In particular when a hollow carrier element such as, for example, a holding tube is inserted in said receiving opening, it is possible to guide the control cables through the hollow carrier element and the feed-through openings to the movable head hinge element and the movable base hinge element and to connect them, well protected from external influences, to the camera hinge arrangement.

To guide the control cable of the moveable base hinge element in a low-friction manner, it can be provided that a, for example the already previously mentioned, base comprises a guide notch, which faces the movable base hinge element and/or a, for example the already previously mentioned, transmission disk of the movable base hinge element and in which the control cable of the movable base hinge element is arrangeable and/or is arranged in the operating position.

In addition to this or as an alternative to it, it can also be provided that a, for example the already previously mentioned, base of the camera hinge arrangement comprises a guide notch which faces the head hinge and in which the control cable of the movable head hinge element is arrangeable and/or is arranged in the operating position.

In order to be able to perform an adjustment of the movable head hinge element in as simple a manner as possible by pulling on its control cable, it can be expedient when a transmission element is connected non-rotatably to the movable head hinge element. The control cable of the movable head hinge element can be fastened, in the simplest case knotted, on the transmission element. It can be expedient when the previously described transmission element is realized in a disk-shaped or wheel-shaped manner and is provided with a radial, circumferential transmission groove, in which the control cable of the movable head hinge element is arranged in the operating position. A diameter of the transmission element can then define a gear ratio and the necessary path of movement for adjusting the angle of the movable head hinge element.

In order to treat the restoring element of the movable base hinge element carefully and to limit a pivot angle of the movable base hinge element and/or to define a starting position of the movable base hinge element, it can be expedient when a stop is realized on a, for example the already previously mentioned, base of the camera hinge arrangement and/or on a, for example the already previously mentioned, second base hinge element and a counter stop is realized on the movable base hinge element. In the starting position, that is to say when there is no pull on the control cable of the movable base hinge element, the stop is then able to contact the counter stop.

All elastic elements can serve, in principle, as restoring elements. However, it can be particularly advantageous when the restoring elements are springs, in particular helical springs.

In the case of an expedient embodiment of the camera hinge arrangement according to the invention, it can additionally be provided that the fastening device is a screw, in particular a one quarter inch screw. Consequently, this screw comprises a dimension that is conventional within the field of cameras and video cameras and is consequently compatible with a large part or practically with all the cameras available on the market. In particular, the cameral hinge arrangement according to the invention is suitable for use with a so-called action compact system camera or action cam.

In the case of a particularly advantageous embodiment of the camera hinge arrangement, it is provided that the fastening device is a knurled screw, in particular a one quarter inch knurled screw. By use of the knurled screw, on the one hand a video recording device can be fastened on the camera hinge arrangement very quickly and additionally fastened thereon without any tooling. On the other hand, by use of the knurled screw it is possible to secure the video recording device at an arbitrary starting angle or even at a zero angle on the fastening device and consequently on the camera hinge arrangement. A starting angle or zero angle is to be understood, in this case, as the angle which the video recording device assumes when pull is exerted on the control cables of the camera hinge, that is to say when said video recording device has assumed its starting position.

BRIEF DESCRIPTION OF THE DRAWINGS

An exemplary embodiment of the camera hinge arrangement according to the invention is described in more detail below by way of the drawing, in which, in a sometimes highly schematized representation.

DETAILED DESCRIPTION OF THE PREFERRED EMBODIMENTS

Figure 1:
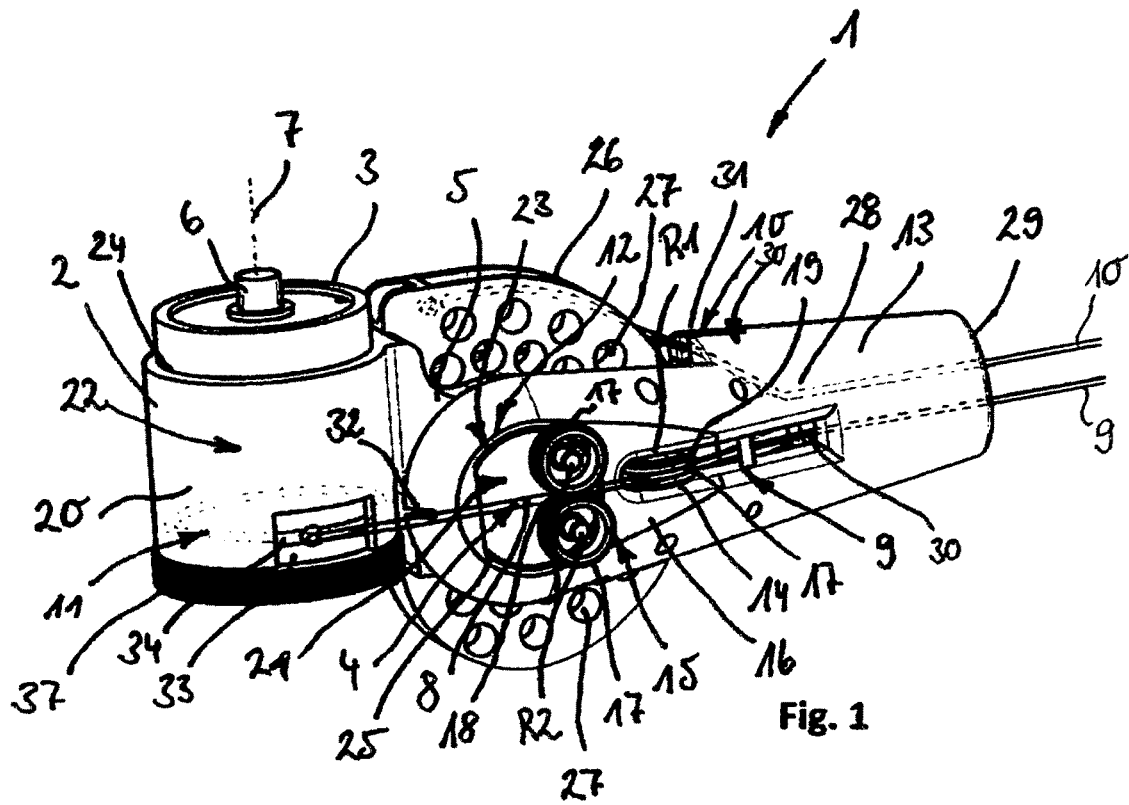
FIG. 1: shows a perspective side view of a camera hinge arrangement according to the invention, it being possible to see the head hinge with the movable head hinge element and the base hinge with the movable base hinge element as well as a base of the camera hinge arrangement with a first guide roller and with a pair of second guide rollers for a control cable of the movable head hinge element.

A camera hinge arrangement designated throughout by the reference 1 comprises a head hinge 2 with a movable head hinge element 3 and a base hinge 4 with a movable base hinge element 5. All the figures show that the head hinge 2 and the base hinge 4 are connected together by the movable base hinge element 5.

A fastening device 6 for the releasable fastening of a video recording device (not shown in the figures) is arranged on the movable head hinge element 3.

Such a video recording device can be, for example, a handy camera, a video camera, a photo camera, a compact camera and/or a system camera. Obviously, it is also possible to arrange so-called action compact system cameras, also called action cams or sport cameras, on the fastening device 6.

A head hinge axis 7, in this case, is aligned transversely, here even at right angles to a base hinge axis 8. The head hinge 2 and the base hinge 4 are pivotable in a mechanical-manual manner.

The camera hinge arrangement 1 comprises in each case one control cable 9, 10 and in each case one restoring element 11 and 12 for the movable head hinge element 3 and the movable base hinge element 5.

The movable head hinge element 3 and the movable base hinge element 5, in this case, are connected in such a manner in each case to a control cable 9, 10 and in each case to at least one restoring element 11, 12 that the movable head hinge element 3 and the movable base hinge element 5 are movable out of a starting position in opposition to a restoring force of the restoring elements 11, 12 as a result of pull on the control cables 9, 10.

The figures show that the camera hinge arrangement 1 includes a base 13. A first guide roller 14 and a pair of second guide rollers 15 for guiding the control cable 9 of the movable head hinge element 3 are arranged on said base 13. In this case, a rotational axis R1 of the first guide roller 14 is aligned parallel to the head hinge axis 7. Rotational axes R2 of the pair of second guide rollers 15 are aligned transversely, here even at right angles, to the rotational axis R1 of the first guide roller 14.

Figure 3:
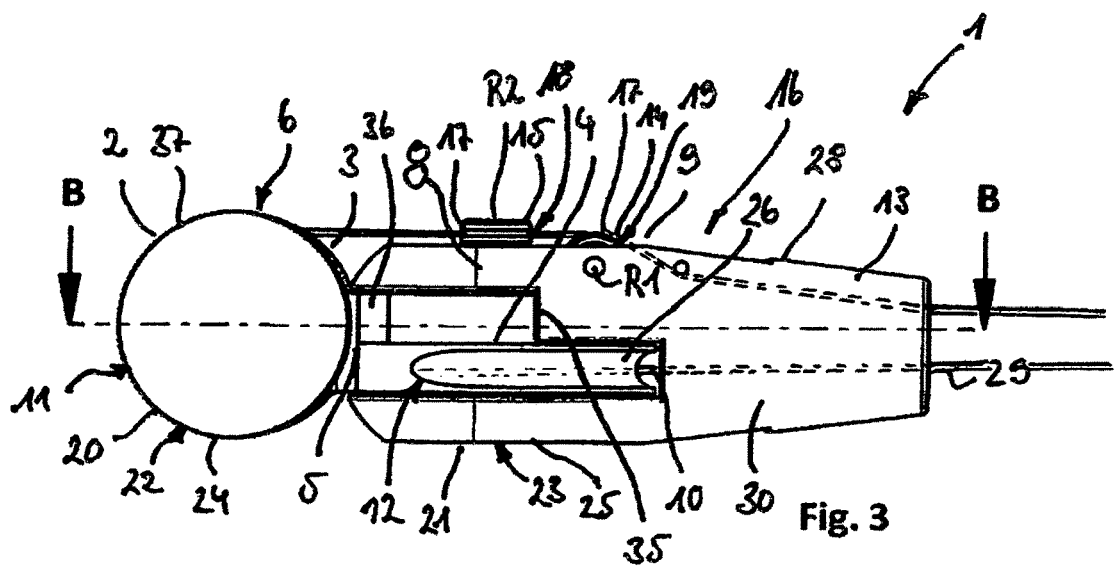
Figure 4:
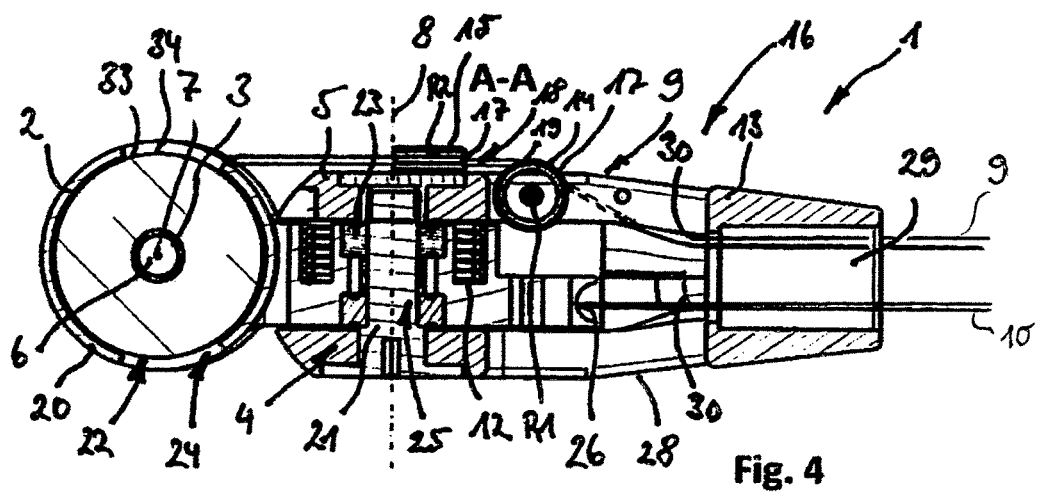

FIGS. 3 and 4, in particular, show that the first guide roller 14 and the pair of second guide rollers 15 are arranged at a spacing from a longitudinal center axis of the camera hinge arrangement 1 and also at a spacing from a longitudinal center axis of the base 13. It can also be seen from the perspective representation of the camera hinge arrangement 1 according to FIG. 1 that the first guide roller 14 and the pair of second guide rollers 15 are arranged on a free outside surface 16 of the base 13. According to FIGS. 1, 3 and 4, each guide roller 14 and 15 comprises a radial guide groove 17 for guiding the control cable 9 of the movable head hinge element 3.

FIG. 1 shows that the pair of second guide rollers 15 is arranged in such a way on the base 13 that radial guide grooves 17 of the pair of second guide rollers 15 form a guide duct 18, through which the control cable 9 of the movable head hinge element 3 runs in the operating position.

The guide duct 18, in this case, is arranged such that a longitudinal axis of the guide duct 18 is parallel to a longitudinal axis of the base 13.

It can additionally be seen that the first guide roller 14 is arranged in such a way on the base 13 that a tangent placed onto a groove bottom 19 of the guide groove 17 of the first guide roller 14 runs through the guide duct 18 between the pair of second guide rollers 15.

Figure 5:
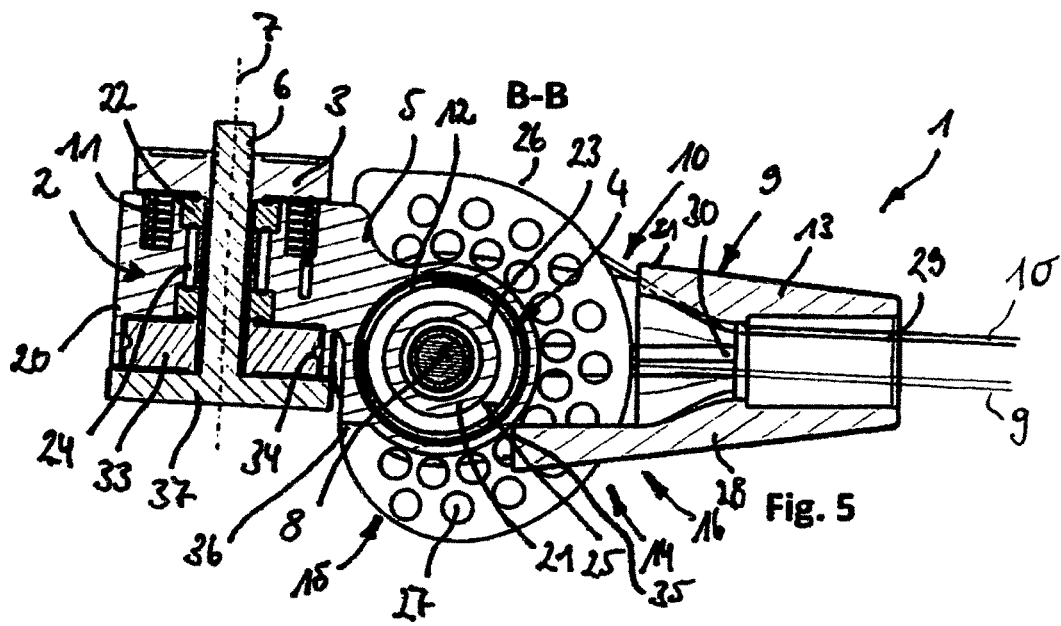
FIG. 5: shows a side view of the camera hinge arrangement according to the invention shown in FIGS. 1 to 4, sectioned along the cutting line B-B shown in FIG. 3.

From the sectioned representation according to FIG. 5, it can be seen that the restoring element 11 is arranged between movable base hinge element 3 and a second base hinge element 20.

From the sectioned representation according to FIG. 4, it can be seen that the restoring element 12 is arranged between the movable base hinge element 5 and a second base hinge element 21.

The second head hinge element 20, as shown in the figures, is integrally connected to the movable base hinge element 5 of the camera hinge arrangement 1 in one piece.

A head bearing 22, which is only shown in a schematized manner in the figures, is arranged between the movable head hinge element 3 and the second head hinge element 20.

Depending on the embodiment of the camera hinge arrangement 1 according to the invention, this head bearing 22 can be a ball bearing but also a sliding bearing.

The sectioned representation according to FIG. 4 shows that a base bearing 23, which is shown in FIG. 4 in a highly schematized manner, as also the head bearing 22, is provided between the movable base hinge element 5 and the second base hinge element 21. Depending on the embodiment of the camera hinge arrangement 1 according to the invention, the base bearing 23 can also be realized as a ball bearing but also as a sliding bearing.

The second head hinge element 20 comprises a cavity 24. The head bearing 22, the restoring element 11 of the movable head hinge element 3 and at least part of the movable head hinge element 3 are arranged in said cavity 24.

The movable base hinge element 5 also comprises a cavity 25. The base bearing 23, the restoring element 12 of the movable base hinge element 5 and at least part of the second base hinge element 21 are arranged in said cavity 25.

The movable base hinge element is realized in a plate-shaped or wheel-shaped manner in the case of the exemplary embodiment of the camera hinge arrangement according to the invention shown in the figures and comprises a radial guide channel 26 which extends over at least part of its periphery.

The control cable 10 of the movable base hinge element 5 is guided in said guide channel 26 in the operating position.

In the case of an embodiment of the camera hinge arrangement 1 according to the invention not shown in the figures, the camera hinge arrangement 1 comprises a transmission disk, which is connected non-rotatably to the movable base hinge element 5 and also comprises a radial guide channel which extends over at least part of its periphery. The control cable 10 of the movable base hinge element 5 is also guided in said radial guide channel in the operating position and is thus secured against slipping.

Both in the case of the movable base hinge element 5 shown in the figures and in the case of the previously described transmission disk, the respective guide channels 26 are aligned transversely or even at right angles to the base hinge axis 8.

The base hinge 4 is lockable and a pivot angle of the base hinge 4 can be delimited. This can occur, in particular, by means of a locking element which is not shown in the figures and in the locking position acts between the movable base hinge element 5 and the second base hinge element 21 or also the base 13. In this case, the locking element can be a pin, a ballpoint pen, a screw, a split pin or also a bolt.

Figure 2:
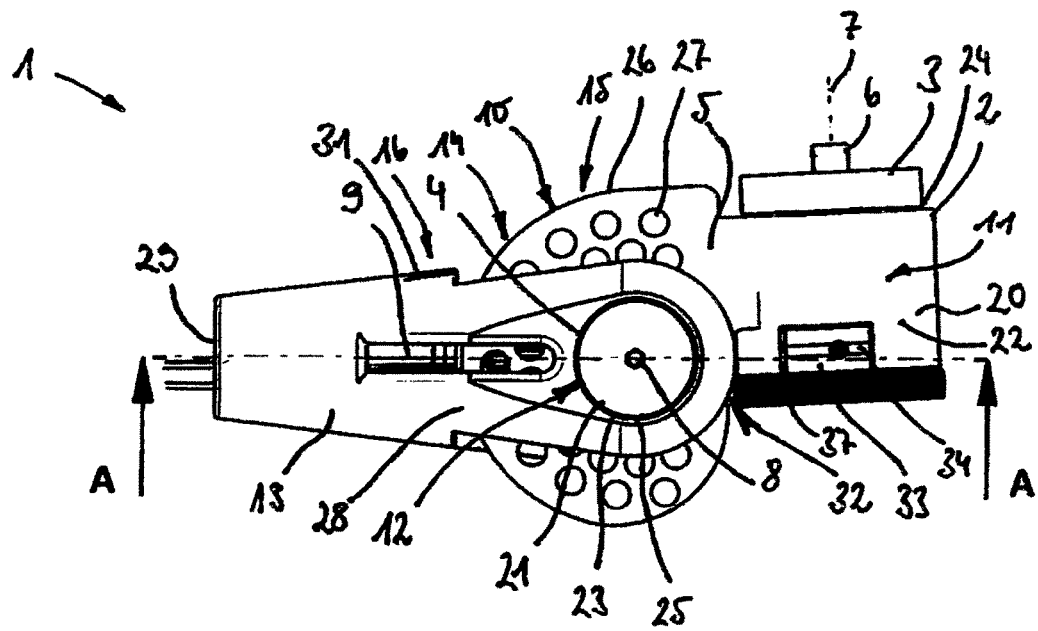
FIG. 2: shows a side view of the camera hinge arrangement shown in FIG. 1, FIG. 3: shows a bottom view of the camera hinge arrangement according to the invention shown in FIGS. 1 and 2, FIG. 4: shows a top view of the camera hinge arrangement according to the invention shown in FIGS. 1 to 3, sectioned along the cutting line A-A

FIGS. 1, 2 and 5, in particular, clarify that the movable base hinge element comprises a plurality of locking openings 27 into which the previously described locking element can be inserted or plugged for limiting the pivot angle and also for locking the base hinge 4. FIGS. 1, 3 and 4, in particular, clarify that the base 13 of the camera hinge arrangement is realized in a bifurcated manner and as a fork 28. The fork 28 is slotted at least on the side on which the guide rollers 14 and 15 are arranged. This makes possible, on the one hand, simple feed-through of the control cable 9 for the movable head hinge element and, on the other hand, a weight of the camera hinge arrangement is reduced as a result, which can facilitate the handling thereof.

The camera hinge arrangement 1 can be connected to a carrier element not shown in the figures by means of its base 13. Such a carrier element can be, for example, a tripod, a camera arm, a camera crane, a holding rod or, however, also a holding tube or the like. In the case of an embodiment of the camera hinge arrangement 1, it is provided, in this case, that the connection between the camera hinge arrangement 1 and the carrier element is realized, in this case, in a releasable manner. To this end, a threaded connection or a screw-connection can be provided between the carrier element and the camera hinge arrangement 1 and in particular the base 13 and the carrier element.

In the case of the exemplary embodiment of the camera hinge arrangement 1 shown in the figures, however, it is provided that the base 13 comprises a receiving opening 29, into which a connection element of a carrier element or, however, also a carrier element itself is insertable. In this case, it can be provided that the carrier element or the connection element of the carrier element, once inserted into the receiving opening 29, is bonded with the base, that is to say a connection between the camera hinge arrangement 1 according to the invention and the carrier element is created which is not non-destructively releasable.

However, it is obviously also conceivable to insert a suitably realized carrier element, which possibly comprises a correspondingly realized connection element, for example just loosely into the receiving opening 29, or, however, to press it into the receiving opening 29 and to create a releasable connection between the camera hinge arrangement 1 according to the invention and the carrier element in this way.

The base 13 additionally comprises feed-through openings 30 for the two control cables 9 and 10 of the camera hinge arrangement 1. In this case, the feed-through openings 30 of the camera hinge arrangement 1 shown in the figures open out into the previously described receiving opening 29 of the base 13.

FIG. 1 additionally shows that the base 13 comprises a guide notch 31, which faces the movable base hinge element 5 and in which the control cable 10 of the movable base hinge element 5 is arranged in the operating position. In addition, the base 13 also comprises a guide notch 32 which faces the head hinge 2 and in which the control cable 9 of the movable head hinge element 3 is arranged in the operating position. Both guide notches 31 and 32, in this case, serve for the purpose of keeping the friction forces acting on the control cables 9 and 19 as low as possible and in this way of making comfortable handling of the camera hinge arrangement 1 according to the invention possible.

The sectional representation of the camera hinge arrangement 1 according to FIG. 5 shows that a transmission element 33 is connected non-rotatably to the movable head hinge element 3. In the operating position, the control cable 9 of the movable head hinge element 3 is fastened, for example knotted, on said transmission element 33. The transmission element 33, in this case, is realized in a disk-shaped manner or also in a wheel-shaped manner and is provided with a radial, circumferential transmission groove 34. The control cable 9 of the movable head hinge element 3 is arranged in the transmission groove 33 in the operating position and is held and guided by the transmission groove 34.

A stop 35 is additionally realized on the base 13. A counter stop 36, which, interacting with the stop 35, limits a pivot angle of the movable base hinge element 5 and defines a starting position of the movable base hinge element 5, is realized on the movable base hinge element 5 in a manner that matches the stop 35. The restoring elements 11, 12 are realized as helical springs.

The fastening device 6 is formed by a one quarter inch knurled screw 37, which enables a video recording device (not shown in the figures) to be fastened on the camera hinge arrangement according to the invention in a simple and, above all, quick manner.

The camera hinge arrangement 1 comprises the head hinge 2 and the base hinge 4. The head hinge 2 includes the movable head hinge element 3, whilst the base hinge 4 includes the movable base hinge element 5. The head hinge 2 and the base hinge 4 are connected together by means of the movable base hinge element 5. The camera hinge arrangement 1 comprises in each case a control cable 9, 10 and in each case at least one restoring element 11, 12 for the movable head hinge element 3 and the movable base hinge element 5. In this case, the movable head hinge element 3 and the movable base hinge element 5 are connected in such a manner in each case to one of the control cables 9, 10 and in each case to at least one of the two restoring elements 11, 12 that the movable head hinge element 3 and the movable base hinge element 5 are movable out of a starting position in opposition to a restoring force of the restoring elements 11, 12 as a result of pull on the control cables 9, 10.

The invention claimed is:

1. A camera hinge arrangement (1) comprising a head hinge (2) with a movable head hinge element (3) and a base hinge (4) with a movable base hinge element (5), wherein the head hinge (2) and the base hinge (4) are connected together by the movable base hinge element (5), a fastening device (6) for the releasable fastening of a video recording device arranged on the movable head hinge element (3), and a head hinge axis (7) is aligned transversely to a base hinge axis (8), a control cable (9, 10) and in each case at least one restoring element (11, 12) assigned respectively to each of the movable head hinge element (3) and the movable base hinge element (5), the movable head hinge element (3) and the movable base hinge element (5) are connected in such a manner in each case to a respective one of the control cables (9, 10) and in each case to a respective one of the at least one restoring elements (11, 12) that the movable head hinge element (3) and the movable base hinge element (5) are movable out of a starting position in opposition to a restoring force of the respective one of the at least one restoring elements (11, 12) as a result of pull on the respective one of the control cables (9, 10), and a base (13), on which a first guide roller (14) and a pair of second guide rollers (15) are arranged for guiding the control cable (9) of the movable head hinge element (3).

2. The camera hinge arrangement (1) as claimed in claim 1, wherein the head hinge (2) and the base hinge (4) are mechanically pivotable by the two control cables (9, 10).

3. The camera hinge arrangement (1) as claimed in claim 1, wherein at least one of the first guide roller (14) or the pair of second guide rollers (15) are arranged at least one of at a spacing from a longitudinal center axis of the camera hinge arrangement (1) or at a spacing from a longitudinal center axis of the base (13).

4. The camera hinge arrangement (1) as claimed in claim 1, wherein each said first and second guide roller (14, 15) comprises a radial guide groove (17) for guiding the control cable (9) of the movable head hinge element (3).

5. The camera hinge arrangement (1) as claimed in claim 4, wherein at least one of the pair of second guide rollers (15) is arranged in such a manner on the base (13) that the radial guide grooves (17) of the pair of second guide rollers (15) form a guide duct (18), through which the control cable (9) of the movable head hinge element (3) runs in an operating position or the first guide roller (14) is arranged in such a manner on the base (13) that a tangent placed onto a groove bottom (19) of a or of the guide groove (17) of the first guide roller (14) runs through the guide duct (18) between the pair of second guide rollers (15).

6. The camera hinge arrangement (1) as claimed in claim 1, further comprising a second head hinge element (20) connected to the movable base hinge element (5).

7. The camera hinge arrangement (1) as claimed in claim 6, further comprising at least one of: at least one head bearing (22) arranged between the movable head hinge element (3) and the second head hinge element (20), or at least one base bearing (23) arranged between the movable base hinge element (5) and the at least one of the second base hinge element (21) or the base (13).

8. The camera hinge arrangement (1) as claimed in claim 7, wherein at least one of: the second head hinge element (20) comprises a cavity (24), in which at least one of the at least one head bearing (22), the at least one restoring element (11) of the movable head hinge element (3), or at least part of the movable head hinge element (3) are arranged, or the movable base hinge element (5) comprises a cavity (25) in which at least one of the at least one base bearing (23), the at least one restoring element (12) of the movable base hinge element (5), at least part of the base (13), or at least part of the second base hinge element (21) are arranged.

9. The camera hinge arrangement (1) as claimed in claim 1, wherein at least one of: the movable base hinge element (5) is plate-shaped or wheel-shaped and comprises a radial guide channel (26), which extends over at least part of a periphery thereof and in which the control cable (10) of the movable base hinge element (5) is guided in an operating position, or the camera hinge arrangement (1) comprises a transmission disk, which is connected in a non-rotatable manner to the movable base hinge element (5) and comprises a radial guide channel which extends over at least part of a periphery thereof, in which the control cable (10) of the movable base hinge element (5) is guided in an operating position.

10. The camera hinge arrangement (1) as claimed in claim 9, wherein the guide channel (26) is aligned transversally or at right angles to the base hinge axis (8) in the movable base hinge element (5) or the transmission disk of the movable base hinge element (5).

11. The camera hinge arrangement (1) as claimed in claim 1, wherein the base hinge (4) is at least one of lockable or a pivot angle of the base hinge (4) is limitable.

12. The camera hinge arrangement (1) as claimed claim 1, wherein the movable base hinge element (5) comprises at least one locking opening (27), into which a locking element is insertable for locking a pivot angle of the base hinge (4).

13. The camera hinge arrangement (1) as claimed in claim 1, wherein the base (13) is bifurcated or formed as a fork (28).

14. The camera hinge arrangement (1) as claimed in claim 1, further comprising a receiving opening (29) located in the base (13) by which the camera hinge arrangement (1) is connectable to a carrier element.

15. The camera hinge arrangement (1) as claimed in claim 1, wherein the base (13) comprises feed-through openings (30) for the two control cables (9, 10).

16. The camera hinge arrangement (1) as claimed in claim 1, wherein at least one of: the base (13) comprises a guide notch (31), which faces at least one of the movable base hinge element (5) or a transmission disk of the movable base hinge element (5) and in which the control cable (10) of the movable base hinge element (5) is arranged in an operating position, or the base (13) comprises a guide notch (32) which faces the head hinge (2) and in which the control cable (9) of the movable head hinge element (3) is arranged in the operating position.

17. The camera hinge arrangement (1) as claimed in claim 1, further comprising a transmission element (33) connected non-rotatably to the movable head hinge element (3), and the control cable (9) of the movable head hinge element (3) is fastened on the transmission element (33).

18. The camera hinge arrangement (1) as claimed in claim 1, further comprising a stop (35) on the base (13) and a counter stop (36) on the movable base hinge element (5), which together at least one of limit a pivot angle of the movable base hinge element (5) or define a starting position of the movable base hinge element (5).

19. The camera hinge arrangement (1) as claimed in claim 1, wherein the restoring elements (11, 12) are springs.

20. The camera hinge arrangement (1) as claimed in claim 1, wherein the fastening device (6) is a screw or a knurled screw (37).

21. A camera hinge arrangement (1) comprising a head hinge (2) with a movable head hinge element (3) and a base hinge (4) with a movable base hinge element (5), wherein the head hinge (2) and the base hinge (4) are connected together by the movable base hinge element (5), a fastening device (6) for the releasable fastening of a video recording device arranged on the movable head hinge element (3), and a head hinge axis (7) is aligned transversely to a base hinge axis (8), a control cable (9, 10) and in each case at least one restoring element (11, 12) assigned respectively to each of the movable head hinge element (3) and the movable base hinge element (5), the movable head hinge element (3) and the movable base hinge element (5) are connected in such a manner in each case to a respective one of the control cables (9, 10) and in each case to a respective one of the at least one restoring elements (11, 12) that the movable head hinge element (3) and the movable base hinge element (5) are movable out of a starting position in opposition to a restoring force of the respective one of the at least one restoring elements (11, 12) as a result of pull on the respective one of the control cables (9, 10), and at least one of: at least one additional restoring element (11, 12) arranged between the movable head hinge element (3) and a second head hinge element (20) or at least one additional restoring element (12) arranged between the movable base hinge element (5) and at least one of a second base hinge element (21) or a base (13).

\* \* \* \* \*